June 18, 1963 W. GEBHARDT ETAL 3,094,669

DEMODULATORS FOR FREQUENCY-MODULATED CARRIER SIGNALS

Filed Oct. 17, 1960

United States Patent Office 3,094,669

Patented June 18, 1963

3,094,669

DEMODULATORS FOR FREQUENCY-MODULATED CARRIER SIGNALS

Wilhelm Gebhardt, Munich, and Friedrich Kuhrt, Nurnberg, Germany, assignors to Siemens-Schuckertwerke Aktiengesellschaft, Erlangen, Germany, a corporation of Germany Filed Oct. 17, 1960, Ser. No. 63,205
Claims priority, application Germany Oct. 17, 1959
8 Claims. (Cl. 329—119)

Our invention relates to demodulating devices for carrier-frequency transmission in telephone, telegraph, radio, video and the like communication, measuring or telemetering systems.

It is an object of our invention to devise a demodulator which combines a particularly simple circuitry with a minimum of exclusively static, solid-state components so as to greatly reduce or virtually eliminate all sources of trouble during a prolonged lifetime of operation.

According to our invention we provide the demodulator with a semiconducting Hall-effect member which is traversed by a current corresponding to the frequency-modulated carrier wave to be demodulated and which is subjected to a magnetic field produced by a tank circuit tuned to the carrier frequency and excited by the carrier-frequency signals, the output circuit of the Hall-effect member being available to furnish the demodulated signal.

According to another feature of our invention the tank circuit, comprising inductance and capacitance in loop connection and being electrically isolated from the signal input and output circuits of the demodulator, is inductively coupled with the signal input circuit by means of an inductance winding which is connected in the signal input circuit.

While the modulated carrier-frequency current passing through the semiconductor Hall member may be obtained by any suitable coupling or transformer means from the signal input circuit, we prefer, according to still another feature of our invention, to connect the Hall-effect member directly in the signal input circuit in series with the above-mentioned inductive coupler winding so that the Hall member is serially traversed by the modulated carrier-frequency signal.

The Hall-effect member preferably consists of a rectangular wafer or plate having two current supply electrodes at respective opposite edges and having two probe or Hall electrodes located on the respective remaining two edges and spaced midway between the two terminal electrodes, so that the Hall voltage appearing between the two probe electrodes furnishes the demodulated output of the device. However, modified Hall plates or other semiconducting Hall-effect members of magnetic field responsive resistance may be used instead, it being only required that the output voltage or current of the Hall-effect member be proportional to the product of the two voltages or currents applied to the semiconductor member terminal electrodes and to the inductance coil of the tuned tank circuit respectively.

The invention will be further explained with reference to the embodiments thereof illustrated by way of example on the accompanying drawing in which.

Figure 1:
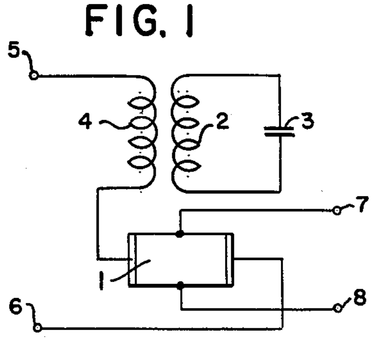
FIG. 1 is a schematic circuit diagram of a first embodiment.

According to FIG. 1 a Hall plate 1 consisting of a thin wafer or coating of semiconductor material, is disposed in the magnetic field of an induction coil 2 which is loop-connected with a capacitor 3 thus forming together therewith a tank circuit. This tank circuit is tuned for resonance with the frequency-modulated carrier wave to be demodulated. While FIG. 1 (or FIG. 4), for the purpose of illustration, shows the Hall plate 1 in a plane identical with the plane of illustration, it will be understood that the plane of the plate actually extends transverse or at a right angle to the axis of the inductance coil 2 so that the magnetic field of the coil 2 passes substantially through the plate 1 at a right angle with respect to the plane of the plate, this being apparent from FIGS. 2 and 3.

The Hall plate 1 has two terminal electrodes which cover the respective short edges of the rectangular plate and are connected in a signal input circuit in series with a coupler winding 4 between input terminals 5 and 6. During operation of the demodulator the winding 4 as well as the plate 1 are traversed by the frequency-modulated high-frequency signal. The winding 4 is inductively coupled with the inductance coil 2 of the tank circuit thus exciting the tank circuit to oscillate at its natural frequency identical with the carrier frequency of the input signal. The Hall plate 1 is further provided with two probe or Hall electrodes connected to respective output terminals 7 and 8.

The performance of the demodulator is predicated upon the fact that the magnetic field produced by the inductance coil 2 of the tank circuit is 90° phase displaced relative to the control current passing through the Hall plate 1 when the carrier frequency is not subjected to modulation. The Hall voltage across output terminals 7, 8 is proportional to the product of magnetic-field intensity times the amount of control current. Hence, the output voltage is zero under the just-mentioned non-modulated condition of the carrier frequency. When the carrier frequency of the signal is modulated, the frequency of the control current passing through the Hall plate 1 varies accordingly, whereas the fixed oscillation frequency of the tank circuit 2, 3 does not participate in the change. Now the Hall generator, acting as a multiplier, furnishes between terminals 7 and 8 an output voltage which varies in accordance with the modulation impressed upon the carrier-frequency input signal. Any remaining high-frequency component of the output can be filtered out when necessary.

Figure 2:
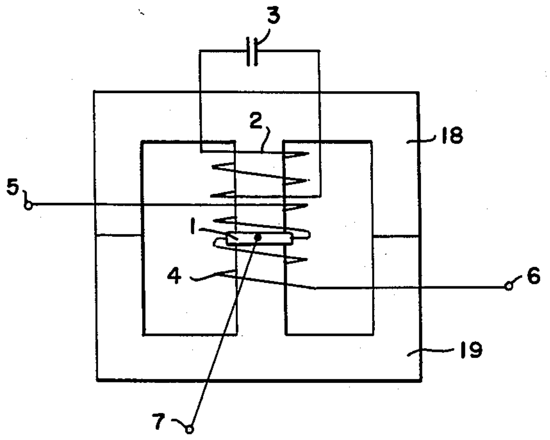
FIG. 2 illustrates a magnetizable core structure and Hall plate applicable with a circuit according to FIG. 1.
Figure 3:
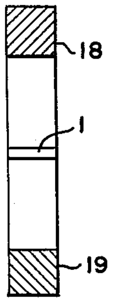
FIG. 3 is a vertical section of the same core structure.

According to FIGS. 2 and 3 the Hall plate 1 is located in a narrow field gap formed in the middle leg of a magnetizable core structure composed of two E-shaped cores 18 and 19 of ferrite. The Hall plate 1 and the corresponding field gap have a thickness of a few microns. The Hall plate may be produced and deposited by vaporizing it upon the gap face of one of the E-cores. The coil 2 and the winding 4 for coupling the input circuit with the tank circuit are both wound upon the center leg of the core structure. The winding 4, serving only to inductively link the signal input circuit with the tank circuit, consists of only a few turns, whereas the inductance coil 2 of the tank circuit has a comparatively high number of turns. This difference in number of turns is necessary because the magnetic field produced by the coupling 4 has some disturbing effect and hence should be kept as low as possible. The ratio of winding turns may be 1:50, for example.

For the purpose of clear illustration in FIG. 2, the coil 2 is shown to occupy only one of the two E-cores, whereas it is preferable to give this coil another portion on the other core as is schematically shown for winding 4. For the same reason, the dimensions of core and Hall plate are shown exaggerated. For most communication or measuring purposes, the axial length of the center leg in the core structure need not be greater than 20 mm.

If, for operation at ultra-high frequency, the use of an iron core for the inductance of the tank circuit is not desirable, a demodulator according to the invention may also be provided with air-cored inductance coils. The design of such a demodulator is essentially the same as the one shown in FIGS. 1 to 3, except that the two E-cores are removed and the Hall plate and windings are mounted on a carrier structure of non-magnetizable material.

If desired, the device may be equipped with means for displacing or adjusting the phase position between the control current passing through the plate 1 and the magnetic field produced by the inductance winding 2 of the tank circuit.

Figure 4:
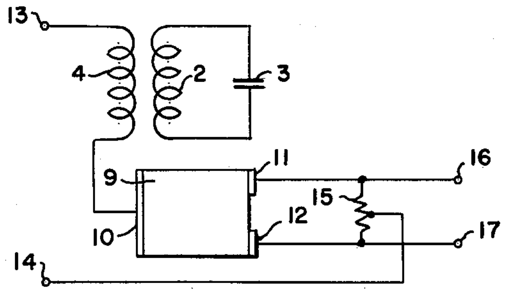
FIG. 4 is a schematic circuit diagram of another embodiment.

The embodiment illustrated in FIG. 4 comprises a tank circuit 2, 3 and an inductive coupler winding 4 as described above but differs by the provision of a modified Hall-effect member. The semiconductor plate 9 of rectangular or approximately square shape has a single terminal electrode 10 along one edge, and two mutually spaced terminal electrodes 11, 12 at the opposite edge. The circuit of the control current is completed by a center-tapped resistor 15 connected between the electrodes 11, 12, the center tap being in connection with one of the input terminals. When the carrier-frequency voltage is applied to the input terminals 13 and 14 of the device, the current driven through the semiconductor plate 9 is uniformly distributed onto the electrodes 11 and 12 as long as no modulation is imposed upon the carrier wave. Then the two terminals 11 and 12 have the same potential so that no output voltage appears across the output terminals 16, 17 connected to the electrodes 11 and 12 respectively. However, when the carrier frequency in the input circuit is modulated, one or the other potential of respective electrodes 11, 12 becomes higher than the other at any given moment so that a low-frequency demodulated signal is available at the output terminals 16, 17.

The Hall-effect plates for the purposes of the invention consist preferably of indium arsenide (InAs) or indium antimonide (InSb). Other semiconductor substances suitable for Hall generators or magneto-responsive resistors are likewise applicable, including the other compounds of the type $A^{III}B^{V}$ (Welker semiconductors) known from Patent 2,798,989, and ternary compounds or mix-crystals such as known, for example, from Patent 2,858,275.

While only one semiconductor body is shown used in the illustrated embodiments described above, a plurality of such semiconductor bodies can be used simultaneously and may be connected in one and the same signal input circuit to jointly provide a demodulated output signal. It will be understood by those skilled in the art, upon a study of this disclosure, that such and other modifications are applicable without departure from the essential features of our invention and within the scope of the claims annexed hereto.

We claim:

1. A demodulator for frequency-modulated carrier signals, comprising a tank circuit in resonance with the carrier frequency and having an inductance coil, a signal input circuit coupled with said tank circuit for exciting it to oscillate, a Hall-effect member disposed in the magnetic field of said inductance coil and connected to said input circuit to be traversed by current due to the modulated carrier signal, said member having an output circuit to provide demodulated output under joint control by said current and said field.

2. A demodulator for frequency-modulated carrier signals, comprising a tank circuit in resonance with the carrier frequency and having an inductance coil and a capacitor, a signal input circuit inductively linked with said inductance coil for exciting said tank circuit to oscillate at said frequency, a Hall-effect member disposed in the magnetic field of said inductance coil and connected to said input circuit to be traversed by current due to the modulated carrier signal, said member having an output circuit to provide demodulated output under joint control by said current and said field, said tank circuit being electrically isolated from said input and output circuits.

3. A demodulator for frequency-modulated carrier signals, comprising a resonance circuit tuned to the carrier frequency and having an inductance coil, a signal input circuit comprising an inductance winding inductively coupled with said coil, a Hall-effect member disposed in the magnetic field of said coil and having a control circuit connected with input circuit to pass through said member a control current derived from the modulated carrier signal, said member having an output circuit to provide demodulated output under joint control by said control current and said field.

4. A demodulator according to claim 3, comprising a rigid structure on which said coil and said winding are coaxially mounted, said structure having a planar face extending transverse to the axis of said coil and winding within the magnetic-field range of said coil, said winding having a small number of turns compared with said coil, and said Hall-effect member being planar and located on said face.

5. A demodulator according to claim 3, comprising a rigid core structure of magnetizable material forming a closed magnetic circuit and having a field gap, said coil and said winding being mounted on, and inductively linked with, said structure, said winding having a small number of turns compared with said coil, and said Hall-effect member being disposed in said gap and having a thickness substantially identical with that of said gap.

6. A demodulator for frequency-modulated carrier signals, comprising a resonance circuit tuned to the carrier frequency and having an inductance coil, a signal input circuit comprising an inductance winding inductively coupled with said coil, a Hall-effect member series-connected with said winding in said input circuit to be traversed by a control current due to the modulated carrier signal, said member having an output circuit to provide demodulated output under joint control by said control current and said field.

7. In a demodulator according to claim 6, said member having a single terminal electrode on one side and two other electrodes mutually spaced on the opposite sides, a resistor connected between said two other electrodes and having a tap, said input circuit extending through said member from said single electrode to said tap, and said output circuit being connected between said two other terminals.

8. A demodulator for frequency-modulated carrier signals, comprising a resonance circuit tuned to the carrier frequency and having an inductance coil, a signal input circuit comprising an inductance winding inductively coupled with said coil, a Hall-effect member having two current supply terminals serially connected with said winding in said input circuit to pass through said member a control current due to the modulated carrier signal, said member having two Hall electrodes intermediate said terminals to provide between said electrodes a Hall voltage under joint control of said control current and said field, and output leads connected to said electrodes to provide a demodulated output signal.

References Cited in the file of this patent

UNITED STATES PATENTS 2,862,189 Kuhrt ---------------- Nov. 25, 1958